United States Patent
Krishnan et al.

(10) Patent No.: US 10,263,886 B2
(45) Date of Patent: Apr. 16, 2019

(54) MOBILE ENDPOINT NETWORK INTERFACE SELECTION USING MERGED POLICIES

(71) Applicant: Avaya Inc., Santa Clara, CA (US)

(72) Inventors: Parameshwaran Krishnan, Basking Ridge, NJ (US); Prithviraj P. Patil, Nashville, TN (US); Navjot Singh, Somerset, NJ (US)

(73) Assignee: Avaya Inc., Santa Clara, CA (US)

( * ) Notice: Subject to any disclaimer, the term of this patent is extended or adjusted under 35 U.S.C. 154(b) by 248 days.

(21) Appl. No.: 15/051,624

(22) Filed: Feb. 23, 2016

(65) Prior Publication Data
US 2017/0244633 A1   Aug. 24, 2017

(51) Int. Cl.
| | | |
|---|---|---|
| *H04L 12/771* | (2013.01) | |
| *H04L 12/813* | (2013.01) | |
| *H04W 76/10* | (2018.01) | |
| *H04L 12/725* | (2013.01) | |
| *H04L 12/717* | (2013.01) | |

(52) U.S. Cl.
CPC ............ *H04L 45/56* (2013.01); *H04L 45/306* (2013.01); *H04L 47/20* (2013.01); *H04W 76/10* (2018.02); *H04L 45/42* (2013.01)

(58) Field of Classification Search
CPC ....... H04L 45/56; H04L 45/306; H04L 45/42; H04L 41/00; H04L 47/20; H04W 76/02
See application file for complete search history.

(56) References Cited

U.S. PATENT DOCUMENTS

| | | | | |
|---|---|---|---|---|
| 9,038,151 | B1* | 5/2015 | Chua | H04L 45/02 709/223 |
| 9,179,007 | B1* | 11/2015 | Yadav | H04M 15/66 |
| 9,380,646 | B2* | 6/2016 | Cui | H04W 92/02 |
| 9,736,699 | B1* | 8/2017 | Rao | H04W 16/14 |
| 10,091,113 | B2* | 10/2018 | Shaw | H04L 47/125 |
| 2009/0034471 | A1* | 2/2009 | Rosenblatt | H04W 36/0022 370/331 |
| 2010/0099393 | A1* | 4/2010 | Brisebois | H04M 15/00 455/418 |
| 2011/0044184 | A1* | 2/2011 | Balasaygun | G06F 9/543 370/252 |
| 2012/0066745 | A1* | 3/2012 | Wuthnow | G06F 21/6245 726/4 |
| 2014/0247140 | A1* | 9/2014 | Proud | H04W 4/70 340/870.02 |
| 2014/0341199 | A1* | 11/2014 | Jeon | H04L 67/2842 370/338 |
| 2015/0055623 | A1* | 2/2015 | Li | H04W 40/04 370/331 |
| 2015/0098393 | A1* | 4/2015 | Tofighbakhsh | H04W 24/02 370/329 |
| 2015/0109967 | A1* | 4/2015 | Hogan | H04M 15/66 370/259 |
| 2015/0163159 | A1* | 6/2015 | DeCusatis | H04L 47/76 709/226 |
| 2015/0288388 | A1* | 10/2015 | Kim | H04W 40/02 370/328 |
| 2015/0312894 | A1* | 10/2015 | Chen | H04W 16/18 370/329 |

(Continued)

*Primary Examiner* — Blake J Rubin

(57) ABSTRACT

Methods, systems and computer readable media for mobile endpoint network interface selection using merged policies.

20 Claims, 3 Drawing Sheets

(56) References Cited

U.S. PATENT DOCUMENTS

| | | | |
|---|---|---|---|
| 2015/0382264 A1* | 12/2015 | Cho | H04L 69/14 370/338 |
| 2016/0006606 A1* | 1/2016 | Zhu | H04W 76/022 370/338 |
| 2016/0044562 A1* | 2/2016 | Joung | H04W 36/14 370/331 |
| 2016/0065422 A1* | 3/2016 | Khargharia | H04L 45/30 370/412 |
| 2016/0095019 A1* | 3/2016 | Cui | H04W 36/0011 370/331 |
| 2016/0095043 A1* | 3/2016 | Maria | H04W 40/24 370/254 |
| 2016/0100340 A1* | 4/2016 | Kim | H04W 36/0083 370/332 |
| 2016/0127889 A1* | 5/2016 | Cui | H04W 36/08 370/328 |
| 2016/0127975 A1* | 5/2016 | Hu | H04W 40/246 455/445 |
| 2016/0135144 A1* | 5/2016 | Tsai | H04W 72/02 455/553.1 |
| 2016/0135222 A1* | 5/2016 | Jain | H04W 74/04 370/329 |
| 2016/0142855 A1* | 5/2016 | Yu | H04W 4/70 455/419 |
| 2016/0183095 A1* | 6/2016 | Huber | H04L 63/102 455/411 |
| 2016/0205171 A1* | 7/2016 | Reddy | H04L 67/06 709/204 |
| 2016/0227440 A1* | 8/2016 | Forssell | H04W 28/08 |
| 2016/0308707 A1* | 10/2016 | Rayavarapu | G06F 3/061 |
| 2016/0309320 A1* | 10/2016 | Piscopo, Jr. | H04W 8/06 |
| 2016/0315785 A1* | 10/2016 | Dronadula | H04L 12/4633 |
| 2016/0374095 A1* | 12/2016 | Jeon | H04L 41/04 |
| 2017/0019424 A1* | 1/2017 | Rodrigues De Moura Leitao | H04L 63/08 |
| 2017/0034298 A1* | 2/2017 | Agarwal | H04L 67/2842 |
| 2017/0041824 A1* | 2/2017 | Costa-Requena | H04L 12/4633 |
| 2017/0093704 A1* | 3/2017 | Cui | H04L 45/22 |
| 2017/0111187 A1* | 4/2017 | Zanier | H04W 4/046 |
| 2017/0111839 A1* | 4/2017 | Yang | H04W 36/22 |
| 2017/0244619 A1* | 8/2017 | Bhatia | H04L 43/08 |
| 2018/0131670 A1* | 5/2018 | Bergeron | H04L 45/24 |

* cited by examiner

MOBILE ENDPOINT NETWORK INTERFACE SELECTION USING MERGED POLICIES

TECHNICAL FIELD

Embodiments relate generally to computer networks, and more particularly, to methods, systems and computer readable media for mobile endpoint network interface selection using merged policies.

BACKGROUND

Some endpoints (e.g., mobile phones) may have multiple network interfaces. The network interfaces could potentially be used to perform intelligent cost-efficient routing. However, communicating network policies to an endpoint and determining routing within an endpoint, especially a mobile device endpoint, may be challenging.

In some conventional systems, devices typically choose a pre-defined more efficient interface if it is available. Users have options to control costs by allowing certain services (e.g., updates) to only be performed when connected to a specific interface (e.g., WiFi). Also, users can manually turn on and off connection to an interface if a service is not working through it. Manual control of interfaces can be tedious and error-prone. Further, some conventional systems may not support utilizing information from both network devices and applications to provide route suggestions.

For example, mobile phones typically have WiFi and one or more cellular network interfaces (e.g., 4G or the like). To reduce costs, phones typically use the lower cost interface (often WiFi), if available. However, WiFi network policies (e.g., within an enterprise network) may not allow connectivity to certain services. There may be no methodical way for such endpoint devices to use both available interfaces and allocate traffic in an intelligent or appropriate manner.

Routers can participate in routing protocols that may provide an efficient route to a destination. Theoretically, endpoints with multiple interfaces could participate in routing protocols, but these endpoints typically are not part of the networking infrastructure and may not be given privileges to participate in them. As mentioned above, a user could set static routes on endpoints to dictate what traffic goes through which interface. However, such techniques may work when endpoints are non-mobile and connected to the same network(s).

Some mobile applications (e.g., Super Download) may try to use all available network interfaces to improve download speed. However, such application layer techniques may not be aware of the characteristics of the underlying networks that the interface(s) are connected to, and thus may be attempting an inappropriate or unavailable connection.

Moreover, when using virtual private networks (VPNs) with split tunneling enabled, a VPN server (e.g., corporate or enterprise server) can provide routing prefixes for the corporate network to the device so that traffic to the corporate network can be routed over the (virtual) VPN interface. This technique uses the notion that there is an existing interface with full connectivity and the VPN server provides restricted subset connectivity. There may be no provision for considering application preference in a conventional VPN architecture.

Embodiments were conceived in light of the above-mentioned needs, problems and/or limitations, among other things.

SUMMARY

One or more embodiments can include methods, systems and computer readable media for mobile endpoint network interface selection using merged policies. In some implementations, a method can include providing a mobile network switch coupled to a mobile software defined network controller (mSDNC) and one or more network interfaces within a user device, and receiving an indication at the mSDNC that the user device has connected to an enterprise network. The method can also include transmitting from the mSDNC to an enterprise software defined network controller (eSDNC) a request for policies of the enterprise network, and receiving at the mSDNC policies of the enterprise network from the eSDNC. The method can further include obtaining user preferences from the user device, and merging the policies and the user preferences into a set of merged policies.

The method can also include configuring at the mSDNC a mobile network switch (mNS) based on the merged policies, and routing application traffic within the user device to one of a plurality of network interfaces based on the configuration of the mNS. The method can further include identifying, at the mSDNC, one or more applications within the user device associated with a given stream of message traffic based on information from an operating system of the user device.

The method can also include receiving at the mSDNC requirements for one or more applications from an operating system of the user device, the requirements provided by the applications to the operating system. The method can further include obtaining application requirements from the user device, and merging the application requirements with the policies and user preferences to generate the set of merged policies. The network interfaces can include a cellular network interface and a wireless network (WiFi) interface.

Some implementations can include a system comprising one or more processors coupled to a nontransitory computer readable medium having stored thereon on software instructions that, when executed by the one or more processors, cause to perform operations. The operations can include providing a mobile network switch coupled to a mobile software defined network controller (mSDNC) and one or more network interfaces within a user device, and receiving an indication at the mSDNC that the user device has connected to an enterprise network. The operations can also include transmitting from the mSDNC to an enterprise software defined network controller (eSDNC) a request for policies of the enterprise network, and receiving at the mSDNC policies of the enterprise network from the eSDNC.

The operations can further include obtaining user preferences from the user device, and merging the policies and the user preferences into a set of merged policies. The operations can also include configuring at the mSDNC a mobile network switch (mNS) based on the merged policies, and routing application traffic within the user device to one of a plurality of network interfaces based on the configuration of the mNS.

The operations can further include identifying, at the mSDNC, one or more applications within the user device associated with a given stream of message traffic based on information from an operating system of the user device. The operations can also include receiving at the mSDNC requirements for one or more applications from an operating system of the user device, the requirements provided by the applications to the operating system.

The operations can further include obtaining application requirements from the user device, and merging the application requirements with the policies and user preferences to generate the set of merged policies. The network interfaces can include a cellular network interface and a wireless network (WiFi) interface.

Some implementations can include a nontransitory computer readable medium having stored thereon software instructions that, when executed by one or more processors, cause the one or more processors to perform operations. The operations can include providing a mobile network switch coupled to a mobile software defined network controller (mSDNC) and one or more network interfaces within a user device, and receiving an indication at the mSDNC that the user device has connected to an enterprise network. The operations can also include transmitting from the mSDNC to an enterprise software defined network controller (eSDNC) a request for policies of the enterprise network, and receiving at the mSDNC policies of the enterprise network from the eSDNC.

The operations can further include obtaining user preferences from the user device, and merging the policies and the user preferences into a set of merged policies. The operations can also include configuring at the mSDNC a mobile network switch (mNS) based on the merged policies, and routing application traffic within the user device to one of a plurality of network interfaces based on the configuration of the mNS.

The operations can further include identifying, at the mSDNC, one or more applications within the user device associated with a given stream of message traffic based on information from an operating system of the user device. The operations can also include receiving at the mSDNC requirements for one or more applications from an operating system of the user device, the requirements provided by the applications to the operating system.

The operations can further include obtaining application requirements from the user device, and merging the application requirements with the policies and user preferences to generate the set of merged policies. The network interfaces can include a cellular network interface and a wireless network (WiFi) interface.

In any of the implementations described above, the steps or operations can further include receiving, at the mSDNC, an indication from the eSDNC that the network inspects secure traffic, and routing traffic for an application indicating a preference for direct communication when using a secure protocol to a network interface other than a network interface corresponding to the eSDNC.

DETAILED DESCRIPTION

Figure 1:
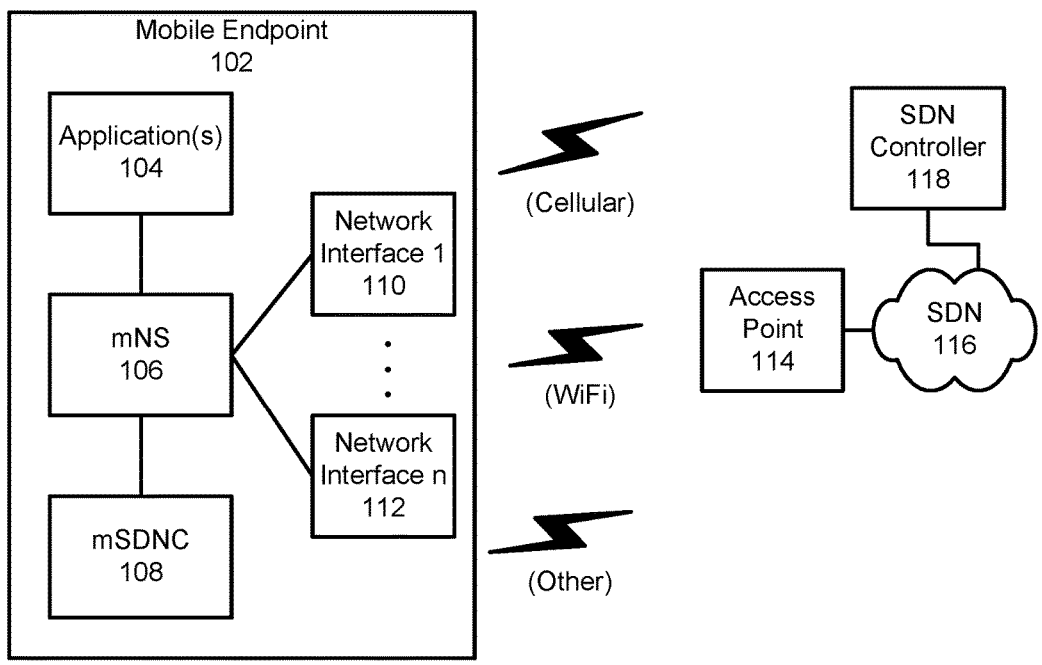
FIG. 1 is a diagram of an example mobile endpoint environment in accordance with at least one implementation.

In general, some implementations can utilize software defined networking and application preference to enable intelligent and policy-based routing at an endpoint (e.g., a mobile device). Software defined networking (SDN) is a well-known networking approach that allows the control plane (e.g., decision making about where to send packets) to be decoupled from the data plane (e.g., actual packet forwarding). The SDN architecture permits controllers to be distributed.

Mobile devices can include one or more network interfaces. For example, smartphones typically have a WiFi interface, a cellular interface (e.g., a 4G connection or other type of cellular connection) and possibly others. It will be appreciated that implementations can be used with other types of devices and more than two network interfaces.

In some implementations, a system can create a (virtual) network switch on a mobile device (mNS) and an SDN controller on the mobile device (mSDNC). When connecting via an interface to a network N, the mSDNC registers with the SDN controller for network N (e.g., an enterprise network SDN controller or eSDNC). The mSDNC and eSDNC can mutually authenticate using known protocols (e.g., certificate based methods). The eSDNC can inform the mSDNC about the policies it supports and perhaps other capabilities (e.g., security level provided, privacy provided, current congestion, etc.). Additionally, applications on the mobile device can provide associated requirements (e.g., security level desired, quality of service (QoS) preferred, etc.) to the mSDNC. Based on combined (or merged) information, the mSDNC can configure routes in the mNS.

For example, a user connects to an enterprise network using employee credentials. The corporate SDN controller (e.g., eSDNC) informs an mSDNC in the user device about policies and capabilities of the eSDNC. For instance, the eSDNC may allow access to all corporate devices, no access to Facebook and Whatsapp (e.g., via the IP address/prefix of sites where access is not permitted), and inspects and logs all packets. The mSDNC may also be informed by the user (e.g., via user preferences) that the user prefers to use a cellular network (e.g., 4G network or other cellular network) for banking apps. The mSDNC can merge the information from the eSDNC with the user preferences to generate merged policies, which can be used to configure a mNS in the user device such that all traffic except banking apps, Facebook and Whatsapp will go through the lower cost WiFi interface connected to the corporate network and the other traffic will use the 4G network or other cellular network.

If the user moves to a WiFi hotspot, all traffic except banking applications can go through the WiFi network. The mSDNC can also use other criteria (e.g., cost, power level, time of day, etc.) to decide on the routes.

Some implementations can utilize an SDN architecture along with one or more of notifications from SDN controllers, mobile device user preferences and information from applications to configure a mNS to utilize the multiple network interfaces of the mobile device based on merged policies of the connected networks. It will be appreciated that the merged policies can include one or more of policies from an eSDNC, capabilities from an eSDNC, mobile device user preferences, mobile device application information, or the like. Some implementations can include using an SDN architecture along with additional attributes in conjunction with application preferences to determine which network interfaces of the device to activate and use for specific destinations based on merged policies.

As another example, an enterprise network may include a man-in-the-middle (MiTM) proxy (e.g., a reverse proxy with false certificate generation) deployed for SSL. The enterprise network can inform a mobile endpoint of this policy via eSDNC to mSDNC communications. A banking application on the mobile endpoint may inform the mSDNC of a preference for direct connection to the end server (e.g., a preference for not sending packets through a MiTM proxy). Assuming that the 4G network (or other cellular network) controller indicates that it does not intercept SSL traffic, packets from the banking application will be matched (e.g., based on the port number of the packets from the banking application) by the mSDNC policy merging engine and lead to installing a route in the mNS configuration that includes using the 4G interface (or other cellular network interface) for banking application packets.

Providing an mSDNC and mNS on the endpoint permits an application generating packets to not have to explicitly communicate directly with the eSDNC. The mSDNC can collect information from an operating system of the mobile endpoint to identify the application generating the flow. This information can be combined with application requirements (or hints) provided by the application to the OS/mSDNC during application runtime, at application installation time or at application update time.

FIG. 1 is a diagram of an example mobile endpoint environment 100 in accordance with at least one implementation. The environment 100 includes a mobile endpoint 102, an access point 114, an SDN 116 and an SDN controller 118 (e.g., an eSDNC). It will be appreciated that an SDN controller may be present in any of the networks that the mobile endpoint can connect to (e.g., including a cellular network (e.g., 4G or the like) or other network).

Figure 2:
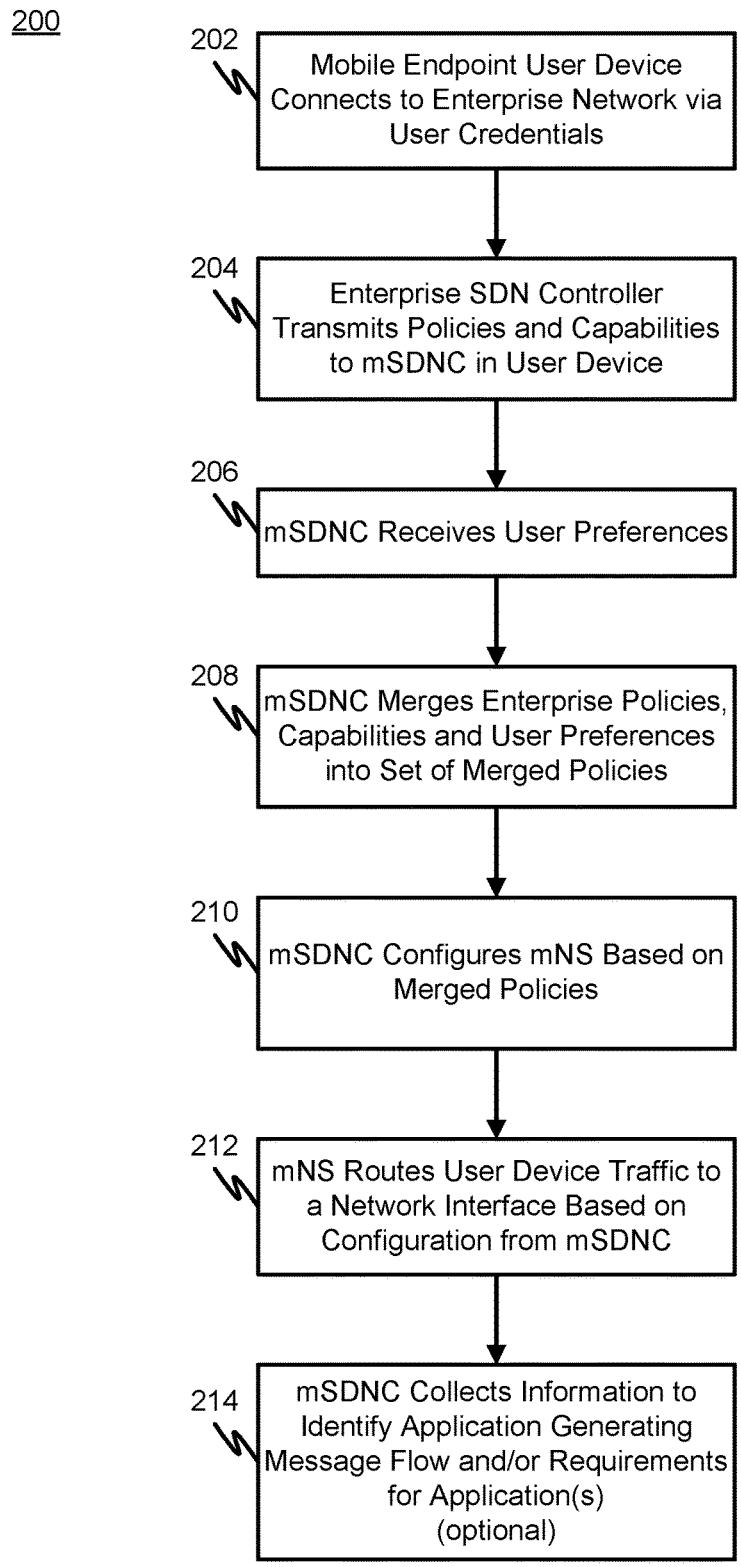
FIG. 2 is a flow chart of an example method of mobile endpoint network interface selection using merged policies in accordance with at least one implementation.

The mobile endpoint 102 can include one or more applications 104, a mobile network switch 106 (mNS), a mobile software defined network controller 108 (mSDNC), a plurality of network interfaces (110-112). The mobile endpoint 102 can include interfaces for networks such as cellular (e.g., 4G or the like), WiFi, and others as shown by the bolts emanating from the mobile endpoint 102. FIG. 2 shows a flowchart of an example process for mobile endpoint network interface selection using merged policies.

In FIG. 2, processing begins at 202, where a mobile endpoint user device (e.g., 102) connects to a network (e.g., 116) via user credentials. Processing continues to 204.

At 204, an SDN controller, or eSDNC (e.g., 118), transmits policies, attributes, and/or capabilities to an mSDNC (e.g., 108) in the mobile endpoint (102). The information from the eSDNC to the mSDNC could be sent using suitable SDNC to SDNC messaging protocols. The eSDNC may transmit the policies, attributes, and/or capabilities when the mobile endpoint first connects to the network, when the policies, attributes, and/or capabilities are updated, when a new application is started on the mobile endpoint, and/or at the request of the mSDNC in the mobile endpoint. The policies, attributes and/or capabilities of the network can include one or more of the following: security policies, firewall rules, interception of traffic information, priority of traffic, bandwidth allocated, types of destinations allowed (or not allowed), throttling parameters, logging within the network, cost, power level, time of day, quality of service (QoS), or other relevant network policy, attribute or capability. Processing continues to 206.

At 206, the mSDNC of the endpoint device receives (or obtains) user preferences. User preferences may be obtained from the mobile endpoint (e.g., from the operating system of the mobile endpoint). User preferences can include preferences such as which network to use when, and for what applications. In other words a user preference may specify an order in which to utilize networks for transferring data, when to use each network interface (e.g., based on time of day, location, cost, etc.), what applications should use which network interface (e.g., only use cellular for banking applications, etc.), etc. Also, the mSDNC may collect information about which applications are associated with a given message flow. This information may be obtained from the operating system of the mobile endpoint, for example. Further, the mSDNC may collect application requirements provided by respective applications to the operating system of the mobile endpoint. Application information and/or requirements may be declared by respective applications and provided to the mobile endpoint operating system (or to the mSDNC or other subsystem) at application installation time, at application run time, and/or at application update time. Processing continues to 208.

At 208, the mSDNC merges the policies, attributes and/or capabilities and the user preference information into a set of merged policies. Any conflict in the merged policies may be detected and the mSDNC may determine how to resolve such conflict. One example of providing a method to resolve conflicts can include assigning priorities to different policies or different sets of policies. Priorities can be assigned by numerical priority, categorical priority (e.g., low, medium, high) or weight value. For example, an application may desire multiple preferences (e.g., security and cost) which might translate to different routing policies. Each preference may have a corresponding weight (e.g., security weighted highest and cost weighted secondary to security), which can be used to resolve conflicts where the highest weighted preference or policy (i.e., the highest priority) controls in the conflict. Priorities can also be assigned to applications, type of data (e.g., voice, video, web, email, etc.), or the like, and these priorities can be used to resolve conflicts in the merged policies. The priorities or policies can also specify a secondary (or fallback) network interface if the primary network interface is not available due to conflict. The merged policies could also include other information such as application information gathered from respective applications in the mobile endpoint or from the operating system of the mobile endpoint. The mSDNC may also perform a matching process to match the mobile endpoint network interfaces and applications with the merged policies to select network interfaces for applications based on the merged policies. Processing continues to 210.

At 210, the mSDNC configures an mNS (e.g., 106) based on the merged policies. The configuration can include the mSDNC transmitting to the mNS information for applications and one or more selected network interfaces for the mNS to use for a corresponding application. Processing continues to 212.

At 212, the mNS routes mobile endpoint traffic to a selected network interface based on the configuration information from the mSDNC. This can include directing the message traffic for an application to a corresponding network interface of the mobile devices based on the mNS configuration. It will be appreciated that the mobile endpoint operating system software may need to include a modification to have packets flow through the mNS so that the mNS can direct those packets to the network interface selected based on the configuration from the mSDNC. Processing continues to 214.

At 214, the mSDNC optionally collects information to identify one or more applications generating a message flow and/or communication requirements for an application.

It will be appreciated that 202-214 can be repeated in whole or in part.

Figure 3:
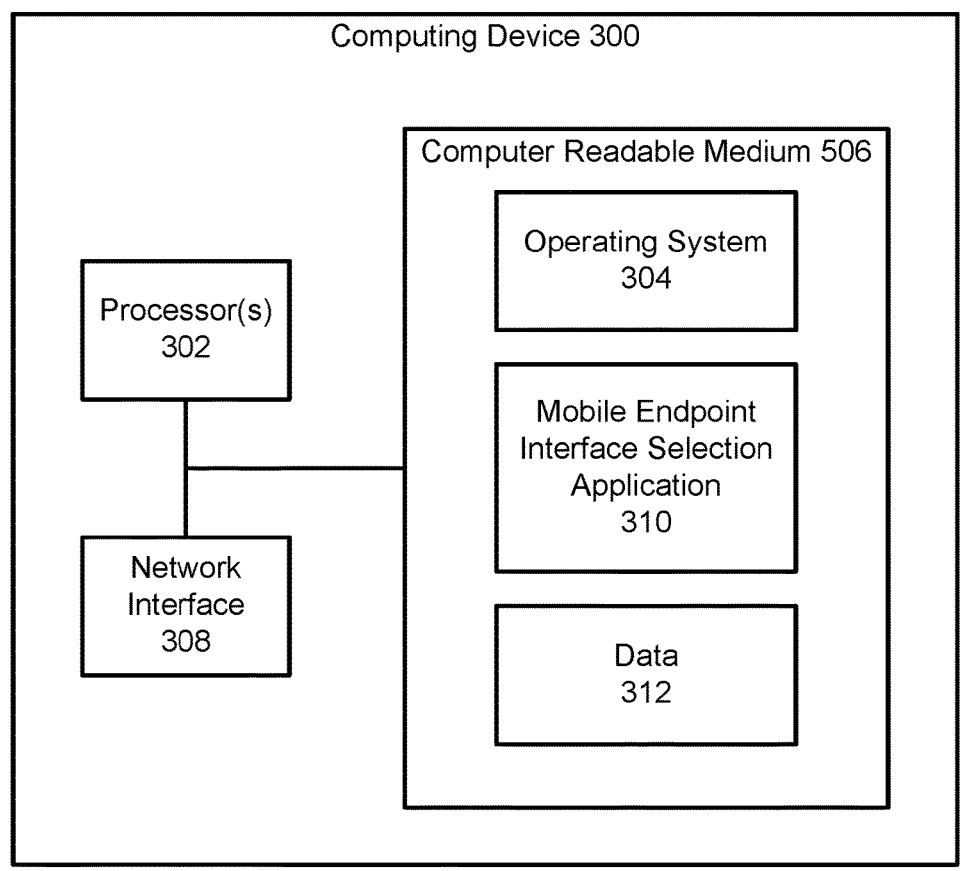
FIG. 3 is a diagram of an example computing device configured for mobile endpoint network interface selection using merged policies in accordance with at least one implementation.

FIG. 3 is a diagram of an example computing device 300 in accordance with at least one implementation. The computing device 300 includes one or more processors 302, nontransitory computer readable medium 306 and network interface 308. The computer readable medium 306 can include an operating system 304, a mobile endpoint network interface selection application 310 using merged policies and a data section 312 (e.g., network interface information, merged policies, etc.).

In operation, the processor 302 may execute the application 310 stored in the computer readable medium 306. The application 310 can include software instructions that, when executed by the processor, cause the processor to perform operations for mobile endpoint network interface selection using merged policies in accordance with the present disclosure (e.g., performing one or more of 202-214 described above).

The application program 310 can operate in conjunction with the data section 312 and the operating system 304.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for mobile endpoint network interface selection using merged policies.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
    providing a mobile network switch (mNS) coupled to a mobile software defined network controller (mSDNC) and one or more network interfaces within a user device, wherein the mSDNC and the mNS are both housed within the user device;
    receiving an indication at the mSDNC that the user device has connected to an enterprise network;
    transmitting from the mSDNC to an enterprise software defined network controller (eSDNC) a request for policies of the enterprise network;
    receiving at the mSDNC policies of the enterprise network from the eSDNC;

obtaining user preferences from the user device;
merging the policies and the user preferences into a set of merged policies;
configuring, at the mSDNC, the mNS based on the merged policies, wherein the mNS includes a first route that uses the enterprise network, and a second route that does not use the enterprise network; and
routing application traffic, using the mNS, within the user device based on configuration information from the mSDNC, wherein a first application traffic is routed via the first route to a first network interface associated with the enterprise network, and a second application traffic is routed via the second route to a second network interface not associated with the enterprise network.

2. The method of claim 1, further comprising:
identifying, at the mSDNC, one or more applications within the user device associated with a given stream of message traffic based on information from an operating system of the user device.

3. The method of claim 1, further comprising:
receiving, at the mSDNC, requirements for one or more applications from an operating system of the user device, the requirements provided by the applications to the operating system.

4. The method of claim 1, further comprising:
obtaining application requirements from the user device; and
merging the application requirements with the policies and user preferences to generate the set of merged policies.

5. The method of claim 1, wherein the network interfaces include a cellular network interface and a wireless network (WiFi) interface.

6. A system comprising:
one or more processors coupled to a nontransitory computer readable medium having stored thereon on software instructions that, when executed by the one or more processors, cause to perform operations including:
providing a mobile network switch (mNS) coupled to a mobile software defined network controller (mSDNC) and one or more network interfaces within a user device, wherein the mSDNC and the mNS are both housed within the user device;
receiving an indication at the mSDNC that the user device has connected to an enterprise network;
transmitting from the mSDNC to an enterprise software defined network controller (eSDNC) a request for policies of the enterprise network;
receiving at the mSDNC policies of the enterprise network from the eSDNC;
obtaining user preferences from the user device;
merging the policies and the user preferences into a set of merged policies;
configuring, at the mSDNC, the mNS based on the merged policies, wherein the mNS includes a first route that uses the enterprise network, and a second route that does not use the enterprise network; and
routing application traffic, using the mNS, within the user device to one of a plurality of network interfaces based on configuration information from the mSDNC, wherein a first application traffic is routed via the first route to a first network interface associated with the enterprise network, and a second application traffic is routed via the second route to a second network interface not associated with the enterprise network.

7. The system of claim 6, wherein the operations further includes:
identifying, at the mSDNC, one or more applications within the user device associated with a given stream of message traffic based on information from an operating system of the user device.

8. The system of claim 6, wherein the operations further include:
receiving at the mSDNC requirements for one or more applications from an operating system of the user device, the requirements provided by the applications to the operating system.

9. The system of claim 6, wherein the operations further include:
obtaining application requirements from the user device; and
merging the application requirements with the policies and user preferences to generate the set of merged policies.

10. The system of claim 6, wherein the network interfaces include a cellular network interface and a wireless network (WiFi) interface.

11. A nontransitory computer readable medium having stored thereon software instructions that, when executed by one or more processors, cause the one or more processors to perform operations including:
providing a mobile network switch (mNS) coupled to a mobile software defined network controller (mSDNC) and one or more network interfaces within a user device, wherein the mSDNC and the mNS are both housed within the user device;
receiving an indication at the mSDNC that the user device has connected to an enterprise network;
transmitting from the mSDNC to an enterprise software defined network controller (eSDNC) a request for policies of the enterprise network;
receiving at the mSDNC policies of the enterprise network from the eSDNC;
obtaining user preferences from the user device;
merging the policies and the user preferences into a set of merged policies;
configuring, at the mSDNC, the mNS based on the merged policies, wherein the mNS includes a first route that uses the enterprise network, and a second route that does not use the enterprise network; and
routing application traffic, using the mNS, within the user device to one of a plurality of network interfaces based on configuration information from the mSDNC, wherein a first application traffic is routed via the first route to a first network interface associated with the enterprise network, and a second application traffic is routed via the second route to a second network interface not associated with the enterprise network.

12. The nontransitory computer readable medium of claim 11, wherein the operations further include:
identifying, at the mSDNC, one or more applications within the user device associated with a given stream of message traffic based on information from an operating system of the user device.

13. The nontransitory computer readable medium of claim 11, wherein the operations further include:
receiving at the mSDNC requirements for one or more applications from an operating system of the user device, the requirements provided by the applications to the operating system.

14. The nontransitory computer readable medium of claim 11, wherein the operations further include:

obtaining application requirements from the user device; and merging the application requirements with the policies and user preferences to generate the set of merged policies.

15. The nontransitory computer readable medium of claim 11, wherein the network interfaces include a cellular network interface and a wireless network (WiFi) interface.

16. The method of claim 1, further comprising:
receiving, at the mSDNC, an indication from the eSDNC that the network inspects secure traffic; and
routing traffic for an application indicating a preference for direct communication when using a secure protocol to a network interface other than a network interface corresponding to the eSDNC.

17. The method of claim 4, wherein obtaining application requirements from the user device includes obtaining application requirements corresponding to a given application from an operating system of the user device, where the application requirements are provided to the operation system by the given application during one or more of installation time, execution time, or update time of the given application.

18. The system of claim 6, wherein the operations further include:
receiving, at the mSDNC, an indication from the eSDNC that the network inspects secure traffic; and
routing traffic for an application indicating a preference for direct communication when using a secure protocol to a network interface other than a network interface corresponding to the eSDNC.

19. The system of claim 9, wherein obtaining application requirements from the user device includes obtaining application requirements corresponding to a given application from an operating system of the user device, where the application requirements are provided to the operation system by the given application during one or more of installation time, execution time, or update time of the given application.

20. The method of claim 1, wherein configuring the mNS to include the first route is based at least on a first user preference of the user preferences, and configuring the mNS to include the second route is based at least on an access restriction policy of the mSDNC policies.

* * * * *